United States Patent
De Vita et al.

(10) Patent No.: US 8,118,961 B2
(45) Date of Patent: Feb. 21, 2012

(54) METHOD OF MANUFACTURING A Z-SECTION COMPONENT FROM COMPOSITE MATERIAL

(75) Inventors: Vincenzo De Vita, Andria (IT); Claudio D'Agostino, Palermo (IT); Matteo Lauriola, Foggia (IT); Ciro Cuciniello, Foggia (IT)

(73) Assignee: Alenia Aeronautica S.p.A., Pomigliano D'Arco, Napoli (IT)

( * ) Notice: Subject to any disclaimer, the term of this patent is extended or adjusted under 35 U.S.C. 154(b) by 94 days.

(21) Appl. No.: 12/598,753

(22) PCT Filed: Apr. 30, 2008

(86) PCT No.: PCT/IB2008/051670
§ 371 (c)(1),
(2), (4) Date: Nov. 3, 2009

(87) PCT Pub. No.: WO2008/135913
PCT Pub. Date: Nov. 13, 2008

(65) Prior Publication Data
US 2010/0126658 A1 May 27, 2010

(30) Foreign Application Priority Data
May 3, 2007 (IT) .............................. TO2007A0294

(51) Int. Cl.
*B29C 70/00* (2006.01)
*B29C 70/24* (2006.01)
(52) U.S. Cl. ....................... 156/243; 156/307.1; 156/285
(58) Field of Classification Search .................... 156/243
See application file for complete search history.

(56) References Cited

U.S. PATENT DOCUMENTS 3,666,600 A 5/1972 Yoshino
3,703,422 A * 11/1972 Yoshino .......................... 156/87
(Continued)

FOREIGN PATENT DOCUMENTS
WO WO 00/44543 8/2000

OTHER PUBLICATIONS

Musch, G.; Bishop, W. "Tooling with reinforced elastomeric materials." 1992. Composites Manufacturing. vol. 3 No. 2. Oxford, GB. pp. 101-111.*

(Continued)

*Primary Examiner* — Philip Tucker
*Assistant Examiner* — Vicki Wu
(74) *Attorney, Agent, or Firm* — Merchant & Gould P.C.

(57) ABSTRACT

A method of manufacturing a Z-section component from composite material uses a mold having a convex mold portion and a concave mold portion. The method includes the preparation of a vacuum bag for a polymerization cycle, including the covering the fresh component with a layer of peel ply formed from a plurality of strips of peel ply and fixing the layer of peel ply perimetrically to the mold using an adhesive tape. A line of sealant is positioned perimetrically above the adhesive tape around the fresh component and a separator film is positioned above the layer of peel ply so as to cover the layer of peel ply and the perimetric line of sealant. A ventilation textile is placed perimetrically on the mold, the textile having an aperture which is positioned so as to leave uncovered an underlying part substantially coinciding with the fresh component. A vacuum bag is applied for the polymerization cycle.

7 Claims, 3 Drawing Sheets

U.S. PATENT DOCUMENTS

| | | | |
|---|---|---|---|
| 4,933,042 A * | 6/1990 | Eichelberger et al. | 156/239 |
| 5,328,540 A | 7/1994 | Clayton et al. | |
| 5,702,663 A * | 12/1997 | Seemann | 264/510 |
| 6,620,369 B1 * | 9/2003 | Mead | 264/409 |
| 2004/0051005 A1 * | 3/2004 | Bergmann | 244/133 |
| 2004/0115299 A1 * | 6/2004 | Potter et al. | 425/389 |
| 2006/0020074 A1 * | 1/2006 | Asada et al. | 524/494 |
| 2008/0217806 A1 * | 9/2008 | Aijima | 264/171.1 |

OTHER PUBLICATIONS

Musch et al. "Tooling with reinforced elastomeric materials." *Composites Manufacturing*, vol. 3, No. 2 (1992), pp. 101-111.

* cited by examiner

METHOD OF MANUFACTURING A Z-SECTION COMPONENT FROM COMPOSITE MATERIAL

This application is a National Stage Application of PCT/IB2008/051670, filed Apr. 30, 2008, which claims benefit of Serial No. TO2007A000294, filed May 3, 2007 in Italy and which applications are incorporated herein by reference. To the extent appropriate, a claim of priority is made to each of the above disclosed applications.

The present invention relates to a method of manufacturing a Z-section component from composite material.

BACKGROUND

It is known that phenomena of various kinds are encountered during the production of a composite component having a final Z-section by laying up a plurality of layers of preimpregnated material, these phenomena being related to the process of polymerization in an autoclave with a vacuum bag, and being caused by the specific geometry of the metallic mould which shapes the component.

This is because the mould has a convex portion and a concave portion adjacent thereto, these portions being positioned so as to impart the desired Z-section to the component. Phenomena acting in opposite ways occur in these two portions during the autoclave process. In the concave portion, the laid-up structure tends to become thicker, while in the convex portion it tends to become thinner. This is caused by the migration of the resin contained in the laid-up structure, due to factors of local pressure variation.

To prevent the component from having local variations in thickness exceeding the specified tolerances, which may be 10% for example, at the end of the autoclave process, it is necessary to minimize the migration of resin due to local pressure variations, and also to remove and/or cause migration of the resin which would naturally tend to become denser in the concave portion.

In order to overcome the aforesaid problems, there has been a development of autoclave processes using moulds and counter-moulds, as well as processes having additional vacuum and/or heat stages, such as "hot forming" and "hot debulking" stages, used to reduce the flow of the resin.

In the first case, the apparatus used has the drawback of being complex and expensive, while in the second case the process is unfavourably complicated and takes a relatively long time to complete.

SUMMARY OF THE INVENTION

The object of the present invention is therefore to provide a method for manufacturing a Z-section component from composite material which can be used with the simplest possible means and without the need to use additional stages of vacuum and/or heat application to inhibit the flow of the resin.

This object is achieved, according to the invention, by a method for manufacturing a Z-section component from composite material.

BRIEF DESCRIPTION OF THE DRAWINGS

Some preferred, but non-limiting, embodiments of the invention will now be described, with reference to the appended drawings, in which.

DETAILED DESCRIPTION OF THE DRAWINGS

Figure 1:
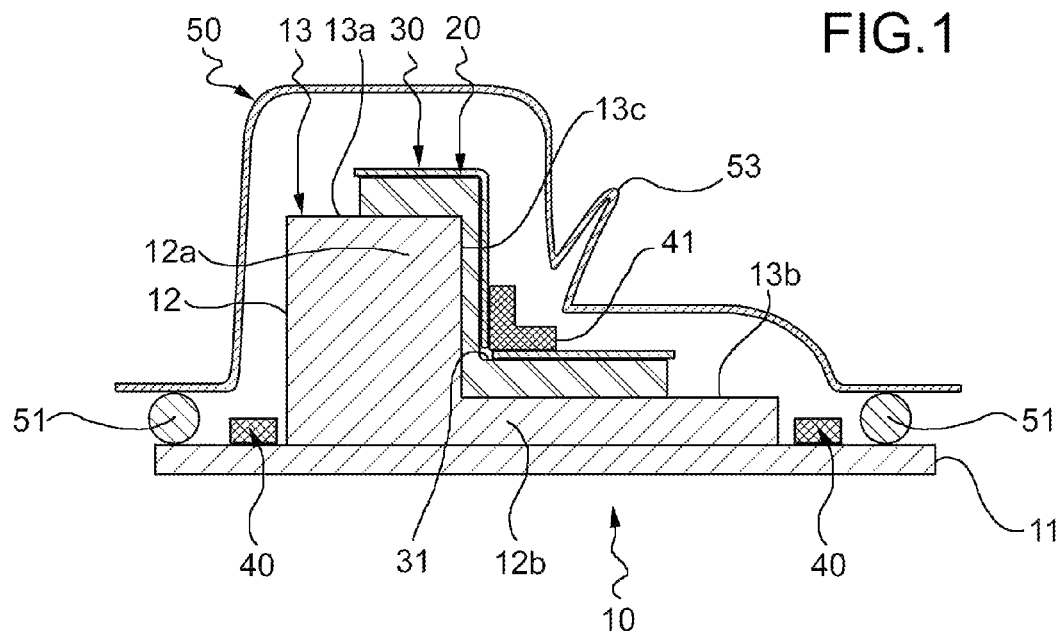
FIG. 1 shows a simplified sectional view of a mould on which a laid-up structure is positioned, and to which a vacuum bag is also applied for the compaction of the laid-up structure in one embodiment of the method according to the present invention.

In the drawings, an apparatus for manufacturing a Z-section component from composite material is indicated as a whole by 10. This apparatus 10 conventionally comprises a base plate 11, on which a mould 12 is fixed. The apparatus 10 is made from a material, such as aluminium, which is commonly used in autoclave polymerization processes using vacuum bags.

The mould 12 is shaped so as to impart the desired Z configuration to the material which is laid on it, and therefore has an upper surface 13 in the form of a step. The upper surface 13 accordingly comprises a first and a second lateral support surface portion 13a and 13b, interconnected by an intermediate connecting surface portion 13c. The connecting surface portion 13c is positioned so that it is inclined with respect to the support surface portions 13a and 13b. In particular, in the illustrated example the connecting surface portion 13c is positioned so that it is perpendicular to the support surface portions 13a and 13b.

The connecting surface portion 13c thus forms, in combination with the first support surface portion 13a, a convex mould portion 12a, having a convex curvature, while in combination with the second support portion 13b it forms a concave mould portion 12b, having a concave curvature, adjacent to the convex mould portion 12a. In the illustrated example, the radius of curvature of the convex and concave mould portions 12a and 12b is close to zero; however, the length of this radius of curvature is not essential for the purposes of the invention.

The apparatus 10, and specifically the mould 12, are designed in a conventional way to be used, in a clean room, for the laying up of one or more layers of preimpregnated material in succession, for the production of a laid-up structure 20 extending over both the convex mould portion 12a and the concave mould portion 12b. The term "laid-up structure" therefore denotes the assembly of layers of preimpregnated material superimposed at a specified point of the manufacturing method, the number of layers in this assembly increasing from one to a predetermined maximum during the laying up of the layers.

The upper surface 13 of the mould 12 can therefore be treated with a release agent or can be coated with a release film to facilitate the release of the finished component from the mould at the end of the polymerization cycle.

For the purposes of the invention, the term "preimpregnated material" denotes in a conventional way a semi-finished product comprising reinforcing fibres and a resin matrix in which these fibres are embedded. The fibres can be positioned in different configurations, for example in a unidirectional layer, in two layers having different orientations from each other, or in the form of a textile. The preimpregnated materials are generally prepared in tape form and wound in reels.

The preimpregnated material is therefore cut to the required dimensions for laying up on the mould 12.

The laid-up structure 20 is subjected to a preliminary stage of compaction, which serves to press the layers of preimpregnated material together and to reduce the number of air bubbles present in the material.

In a preferred embodiment of the invention, this stage of preliminary compaction takes place after each layer of preimpregnated material has been deposited on the previously deposited layers of preimpregnated material, in other words after one layer of preimpregnated material has been added to the previously deposited laid-up structure 20.

Figure 2:
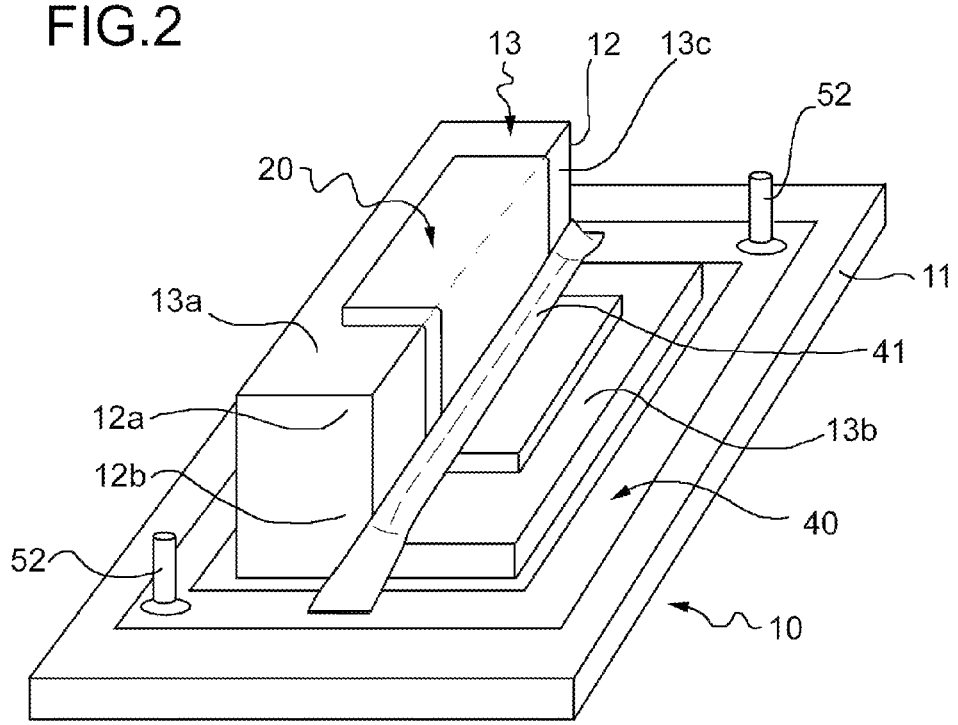
FIG. 2 shows a simplified perspective view of the mould of FIG. 1, in which the vacuum bag is not shown.

This compaction stage is described below with reference to FIGS. 1 and 2.

When the single layer of preimpregnated material has been deposited, this layer is covered with a separator film 30. The term "separator", or alternatively "release film", conventionally denotes a film of plastics material which is generally positioned in contact with the laid-up structure 20 and is treated in such a way that it does not bond to the material of this laid-up structure 20. As a general rule, the separator film is also designed to allow the volatile substances and air present in the laid-up structure 20 to pass through it. Preferably, the separator film 30 is an embossed separator, such as an embossed polyethylene film with a thickness of 50.8 µm (2 mils). The embossed separator has the double advantage of acting as a release agent which does not require additional surface ventilation elements and having a high adaptability to the surface to be covered.

According to the invention, the separator film 30 is divided into two parts, which are positioned on the laid-up structure 20 so as to cover it completely, except for an interruption 31 in the concave mould portion 12b. In other words, the separator film 30 is interrupted, i.e. cut, and the interruption 31 in the concave mould portion 12 extends in a direction perpendicular to the cross section of the laid-up structure 20, over the whole length of the latter. The interruption 31 of the separator prevents any tensioning (bridging) effects of the separator film on the concave portion. To simplify the illustration, the separator film 30 is not shown in FIG. 2.

A perimetric ventilation material 40 is positioned around the mould 12. The term "ventilation material" denotes, in a conventional way, a woven or non-woven material which serves to keep the vacuum bag detached from the mould, thus creating a continuous path which enables the air and volatile substances to be sucked out. Preferably, the perimetric ventilation material 40 is a 181-style glass fibre textile.

A ventilation strip 41 is then positioned above the separator layer 30 at the position of the interruption 31 of this separator layer 30, so that the ventilation strip 41 extends in a direction perpendicular to the cross section of the laid-up structure 20 and has its ends connected to the perimetric ventilation material 40. The ventilation strip 41 forms a preferred path for the application of the vacuum during the compaction stage in the concave portion where the problem of thickening of the laid-up structure 20 is to be avoided. The term "ventilation strip" denotes a strip of ventilation material, where the term "ventilation material" has the meaning explained above. Preferably, the ventilation strip 41 is a 181-style glass fibre textile.

Finally, a preliminary vacuum bag 50 is applied to the mould 12 which supports the laid-up structure 20. In the illustrated example, the vacuum bag 50 is formed from a film of plastics material, for example nylon, laid on the apparatus 10, in which the seal between this film and the apparatus 10 is provided by a conventional sealing tape 51 positioned perimetrically on the base plate 11. For clarity, in FIG. 1 the vacuum bag 50 is shown as if it were raised above the parts lying below it. Evidently, however, this bag 50 tends to sink down on to these parts as a result of the application of the vacuum.

When the preliminary vacuum bag 50 has been prepared, a controlled vacuum is produced in this vacuum bag 50 for a predetermined period. For this purpose, the vacuum bag 50 is conventionally provided with one or more valves 52 (shown in FIG. 2), preferably at least two in number, which are connected at one end to the perimetric ventilation material 40 and at the other end to a suction pump (not shown). To avoid the development of tension in the vacuum bag film 50 in the area of the concave mould portion 12b, this film is pinched, at a point 53 above the concave portion 12b, so as to shape the bag 50 to adapt it to this concave portion 12b. Because of the configuration described above, the air between the various layers is evacuated when the compaction takes place, and additionally the thickness of the unpolymerized laid-up structure is reduced to a minimum, especially in the concave portion.

At the end of the predetermined vacuum compaction period, the preliminary vacuum bag 50, the ventilation strip 41 and the separator film 30 are removed. Thus the laid-up structure 20 is ready for the application of a further layer of preimpregnated material, or, when all the specified layers of preimpregnated material have been deposited, for the preparation of a final vacuum bag designed for the cycle of polymerizing the resin of the laid-up structure 20.

This preparation of the final vacuum bag is described below with reference to FIG. 3.

The laid-up structure 20 is initially covered with a layer of peel ply (peelable textile) 60 formed from a plurality of strips of peel ply 61a, 61b, 61c positioned so as to extend in the direction perpendicular to the cross section of the laid-up structure 20. The term "peel ply" denotes, in a conventional way, a layer added to protect the outer surfaces of the laid-up structure 20 or to modify their surface finish for subsequent treatments. The strips 61a, 61b, 61c of the layer of peel ply 60 are positioned so that they partially overlap each other in the convex mould portion 12a and in the concave mould portion 12b. In particular, an intermediate strip of peel ply 61c is initially applied to a part of the laid-up structure 20 corresponding to the connecting surface portion 13c of the upper surface 13 of the mould 12, and lateral strips of peel ply 61a and 61b are then applied to corresponding parts of the laid-up structure 20 corresponding to the first and second support surface portions 13a and 13b of the upper surface 13 of the mould 12. The lateral strips of peel ply 61a and 61b corresponding to the first support surface portion 13a and to the second support surface portion 13b are also partially overlapped on the intermediate strip of peel ply 61c corresponding to the connecting surface portion 13c. This arrangement enables the laid-up structure 20 to be completely covered, while still allowing the easy positioning of the layer of peel ply 60.

The layer of peel ply 60 is then fixed perimetrically to the mould 12, using an adhesive tape 65, preferably Teflon-coated, such as Permacel P-422 produced by Permacel, A Nitto Denko Company, of East Brunswick, N.J. This tape 65 serves to hold the previously positioned peel ply in place.

A line of sealant 66, such as S-M 5127, produced by Richmond Aircraft Products Inc., of Norwalk, Calif., is then laid perimetrically on the adhesive tape 65 around the laid-up structure 20. This perimetric line of sealant 66 acts as a barrier to control lateral leaks of resin from the laid-up structure 20.

A separator film 70 is then positioned above the layer of peel ply 60 so as to cover this layer of peel ply 60 and the perimetric line of sealant 66.

When the separator film 70 has been laid, a ventilation textile 80 is positioned perimetrically on the mould 12, thus connecting it to the perimetric ventilation material 40. The term "ventilation textile" denotes a textile made of ventilation material, where the term "ventilation material" has the meaning explained above.

Figure 3:
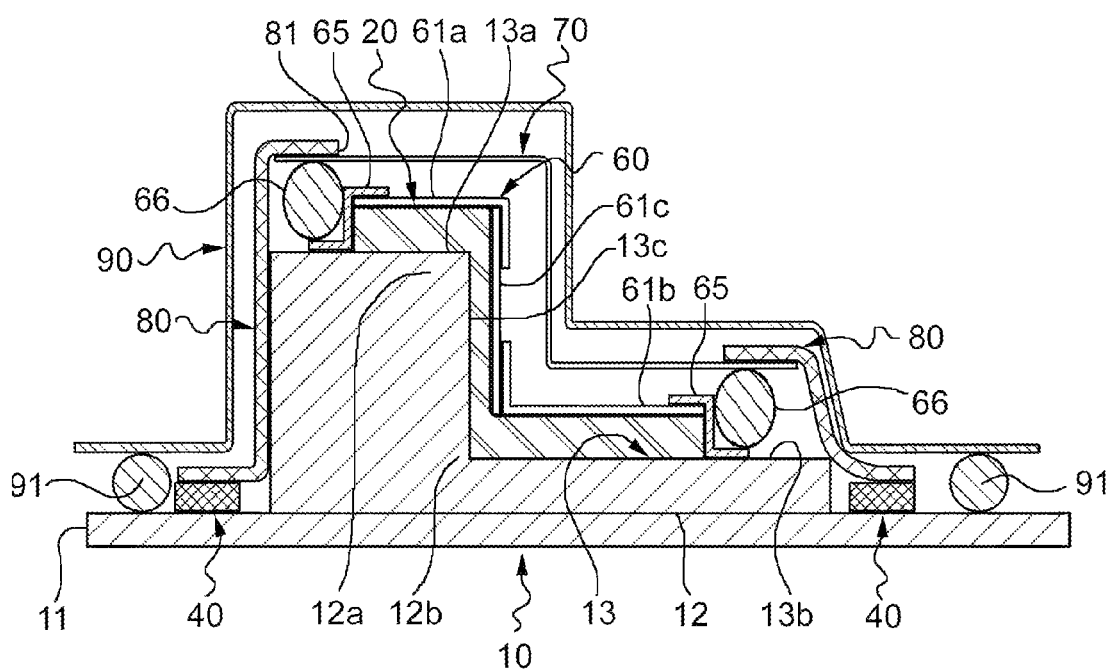
FIG. 3 shows a simplified sectional view of the mould with the laid-up structure of FIG. 1, to which a vacuum bag is applied for a cycle of polymerizing the resin of the laid-up structure according to the method of the present invention.

The ventilation textile 80 has a central aperture 81 which is positioned so as to leave uncovered an underlying part which substantially coincides with the laid-up structure 20, as shown in FIG. 3.

On completion of the preparation, the final vacuum bag 90 is applied to the mould 12 which supports the laid-up structure 20. In the illustrated example, the vacuum bag 90 is formed from a film of plastics material, for example nylon, laid on the apparatus 10, in which the seal between this film and the apparatus 10 is provided by a conventional sealing tape 91 positioned perimetrically on the base plate 11. For clarity, in FIG. 3 the vacuum bag 90, the separator film 70 and the ventilation textile 80 are shown as if they were raised above the underlying parts. Evidently, however, these elements tend to sink down on to the other parts as a result of the application of the vacuum.

When the final vacuum bag 90 has been prepared, it is placed in an autoclave for a polymerization cycle specified according to the resin used for the layers of preimpregnated material of the laid-up structure 20. Clearly, the final vacuum bag 90 is also provided, in a conventional way, with one or more, preferably at least two, valves (not shown), which are connected at one end to the perimetric ventilation material 40 and at the other end to a suction pump (not shown), to keep the contents of the bag under a vacuum even inside the autoclave. With the configuration described above, the action of the pressure is localized in the concave portion during the polymerization stage, and it is also possible to eliminate excess surface resin after the polymerization by removing the peel ply.

Although the preliminary compaction procedure described above is preferable, it is possible, according to the invention, to use other methods which are effectively adaptable to the compaction of a laid-up structure having a Z-section. Two alternative embodiments are mentioned below.

Figure 4:
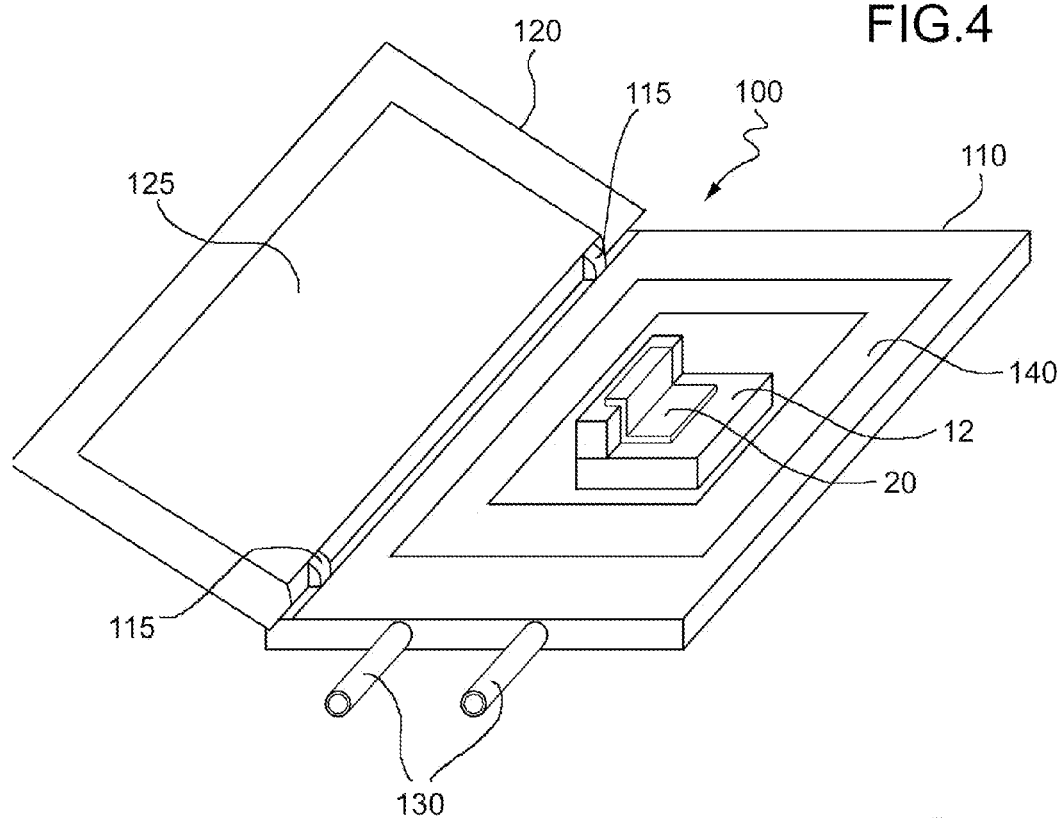
FIG. 4 shows a simplified perspective view of a mould on which a laid-up structure is positioned, the mould being placed in a membrane device for the compaction of the laid-up structure in an alternative embodiment of the method according to the present invention.

In a first alternative embodiment of the invention, the preliminary compaction stage is carried out using a membrane device 100 of a known type, and is carried out after each layer of preimpregnated material has been deposited. The corresponding compaction procedure is described below with reference to FIG. 4.

The membrane device 100 comprises a vacuum sealing plate 110, on which a frame 120 is mounted tiltably, using hinges 115. A membrane 125 of flexible material is surrounded by the frame 120. In a variant which is not shown, the frame is mounted slidably on guides on the plate.

Connectors 130 are positioned on the plate 110 for connection to vacuum lines (not shown), and suction apertures (not shown in FIG. 4) are also provided and are in fluid communication with the connectors 130 for the distribution of the vacuum over the plate 110.

When the membrane device 100 is used, the mould 12 with the laid-up structure 20 placed on it must be positioned on the sealing plate 110 for the preliminary compaction stage.

When the vacuum is applied through the connectors 130, the membrane 125 is adapted precisely to the shape of the mould 12 so as to provide the desired compaction of the laid-up structure 20.

Figure 5:
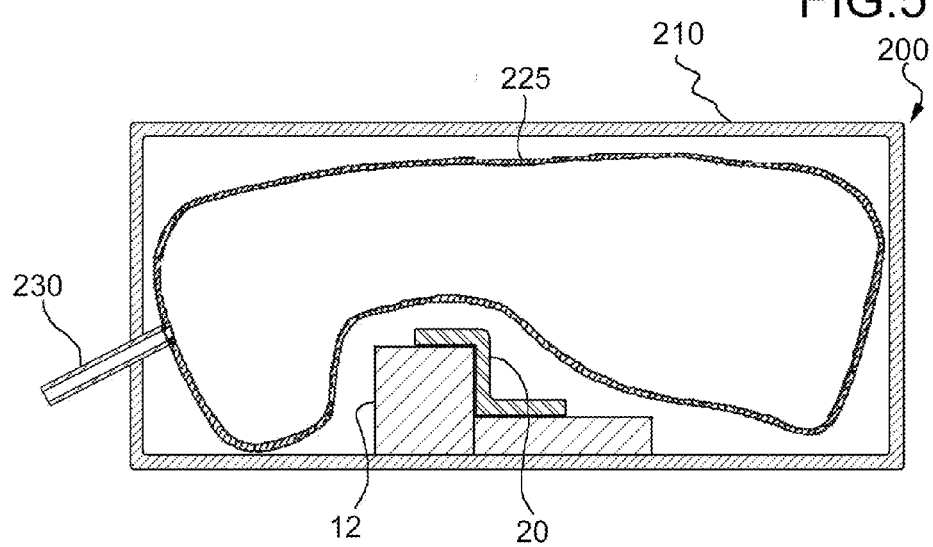
FIG. 5 shows a simplified sectional view of a mould on which a laid-up structure is positioned, the mould being placed in a rubber forming device for the compaction of the laid-up structure in a further alternative embodiment of the method according to the present invention.

In a second alternative embodiment of the invention, the preliminary compaction stage is carried out using a hydro forming device 200 of a known type, and is carried out after each layer of preimpregnated material has been deposited. The corresponding compaction procedure is described below with reference to FIG. 5.

The hydroforming device 200 comprises a box 210 in which a bag 225 of flexible material is placed.

Connectors 230 are connected in a sealed way to the bag 225 for connection to air supply lines (not shown).

When the hydroforming device 200 is used, the mould 12 with the laid-up structure 20 placed on it must be positioned in the box 210 for the preliminary compaction stage.

When pressure is applied through the connectors 230, the bag 225 is inflated and its walls are adapted precisely to the walls of the box 210 and then to the shape of the mould 12 so as to provide the desired compaction of the laid-up structure 20.

The invention claimed is:

1. Method of manufacturing a Z-section component from composite material, using a mould having a convex mould portion and a concave mould portion adjacent thereto, comprising the following stages:
    depositing one or more layers of preimpregnated material in succession on the mould to produce a laid-up structure with a Z-shaped cross section extending over said convex mould portion and over said concave mould portion,
    subjecting said laid-up structure on the mould to preliminary compaction in a vacuum bag,
    subjecting said laid-up structure on the mould to a polymerization cycle in a vacuum bag,
    wherein said polymerization cycle is preceded by the preparation of a final vacuum bag of said polymerization cycle, comprising the following stages:
    covering said laid-up structure with a layer of peel ply, formed by a plurality of strips of peel ply positioned to extend along said direction perpendicular to the cross section of the laid-up structure and to partially overlap each other in said convex mould portion and in said concave mould portion,
    fixing said layer of peel ply perimetrically to said mould, using an adhesive tape,
    laying a line of sealant perimetrically on said adhesive tape around said laid-up structure,
    positioning a separator film above said layer of peel ply to cover said layer of peel ply and said perimetric line of sealant,
    positioning a ventilation textile perimetrically on the mould, connecting the ventilation textile to a perimetric ventilation material positioned around said mould, said ventilation textile having an aperture positioned to leave uncovered an underlying part substantially coinciding with said laid-up structure, and
    applying said final vacuum bag to said mould which supports the laid-up structure for the polymerization cycle;
    said stage of preliminary compaction taking place after each layer of preimpregnated material has been deposited, said stage of preliminary compaction comprising the following steps:
    covering said layer of preimpregnated material with a separator film, said separator film having an interruption at said concave portion, extending in a direction perpendicular to said cross section of the laid-up structure, positioning said perimetric ventilation material around said mould, positioning a ventilation strip above the separator film at the position of the interruption of said separator layer, so that said ventilation strip extends in said direction perpendicular to the cross section of the laid-up structure and is connected at ends of the ventilation strip to said perimetric ventilation material, applying a preliminary vacuum bag to said mould which supports the laid-up structure and producing a controlled vacuum in said vacuum bag for a specified period, and removing said preliminary vacuum bag, ventilation strip and separator film at the end of said specified period.

2. Method according to claim 1, wherein said stage of covering the laid-up structure with said layer of peel ply, a strip of peel ply is initially applied to an intermediate part of the laid-up structure, and strips of peel ply are applied to corresponding lateral parts of the laid-up structure, the lateral strips of peel ply also partially overlapping the intermediate strip of peel ply.

3. Method according to claim 1, wherein said separator film is an embossed separator.

4. Method according to claim 1 wherein at least one of said perimetric ventilation material and ventilation strip is made from 181-style glass fibre textile.

5. Method according to claim 1, said adhesive tape comprising a Teflon-coated adhesive tape.

6. Method according to claim 1, wherein said stage of preliminary compaction takes place after each layer of pre-impregnated material has been deposited, is a membrane compaction process, and comprises the following stages:

positioning said mould with said laid-up structure on a vacuum sealing plate, closing in a sealed way on to said vacuum sealing plate a frame which surrounds a membrane of flexible material, so that said membrane sinks down on to said mould and on to said laid-up structure, and producing a controlled vacuum below said membrane for a predetermined period.

7. Method according to claim 1, wherein said stage of preliminary compaction takes place after each layer of pre-impregnated material has been deposited, is a hydroforming compaction process, and comprises the following stages:

positioning said mould with said laid-up structure inside a box, positioning a bag made from flexible material in said box, and introducing a fluid pressure into said bag so that said bag is inflated and its walls of said bag adapt precisely to the walls of said box and then to said mould.

* * * * *